United States Patent [19]

Scarbrough

[11] 4,314,356
[45] Feb. 2, 1982

[54] HIGH-SPEED TERM SEARCHER

[75] Inventor: Alfred D. Scarbrough, Northridge, Calif.

[73] Assignee: Bunker Ramo Corporation, Oak Brook, Ill.

[21] Appl. No.: 88,048

[22] Filed: Oct. 24, 1979

[51] Int. Cl.[3] .................................................. G06F 13/00
[52] U.S. Cl. ..................................................... 364/900
[58] Field of Search ... 364/200 MS File, 900 MS File; 365/49, 50

[56] References Cited

U.S. PATENT DOCUMENTS

| | | | |
|---|---|---|---|
| 3,221,308 | 11/1965 | Petersen et al. | 364/900 |
| 3,243,783 | 3/1966 | Rabenda et al. | 364/900 |
| 3,328,769 | 6/1967 | Lee | 364/900 |
| 3,435,423 | 3/1969 | Fuller et al. | 364/900 |
| 3,538,503 | 11/1970 | Jitsukawa et al. | 364/900 |
| 3,909,796 | 9/1975 | Kitamura | 364/900 |
| 3,947,825 | 3/1976 | Cassada | 364/900 |
| 4,003,029 | 1/1977 | Niiho | 364/900 |
| 4,152,762 | 5/1979 | Bird et al. | 364/200 |

Primary Examiner—Joseph M. Thesz
Assistant Examiner—Thomas M. Heckler
Attorney, Agent, or Firm—F. M. Arbuckle; A. Freilich

[57] ABSTRACT

A method and apparatus for high-speed searching of a byte stream for predetermined words or terms. More particularly, the present invention is directed to a method and apparatus for use in combination with a data source supplying a stream of binary signals defining both the identities of alphanumeric characters occurring in an ordered sequence and the position of each such character within a character group for detecting the occurrence of a particularly ordered group of R characters. The apparatus preferably includes a search memory means comprised of multiple (N) sets of R storage locations each of which includes S bit stages, each bit stage being capable of storing a "1" or "0" state. R represents the number of characters within a character group and S represents the number of different characters that can be identified. Each of the R storage locations may store one or more "0" bits, the position of each "0" bit identifying a particular character. A first decoding means is provided responsive to the position within a character group of each character defined by the binary signals for addressing a corresponding one of the R locations. A second decoding means is provided responsive to the identity of each character defined by the binary signals for addressing a particular one of the S bit stages within the addressed location. The addressing of a stage storing a "1" generates a word mismatch signal.

12 Claims, 5 Drawing Figures

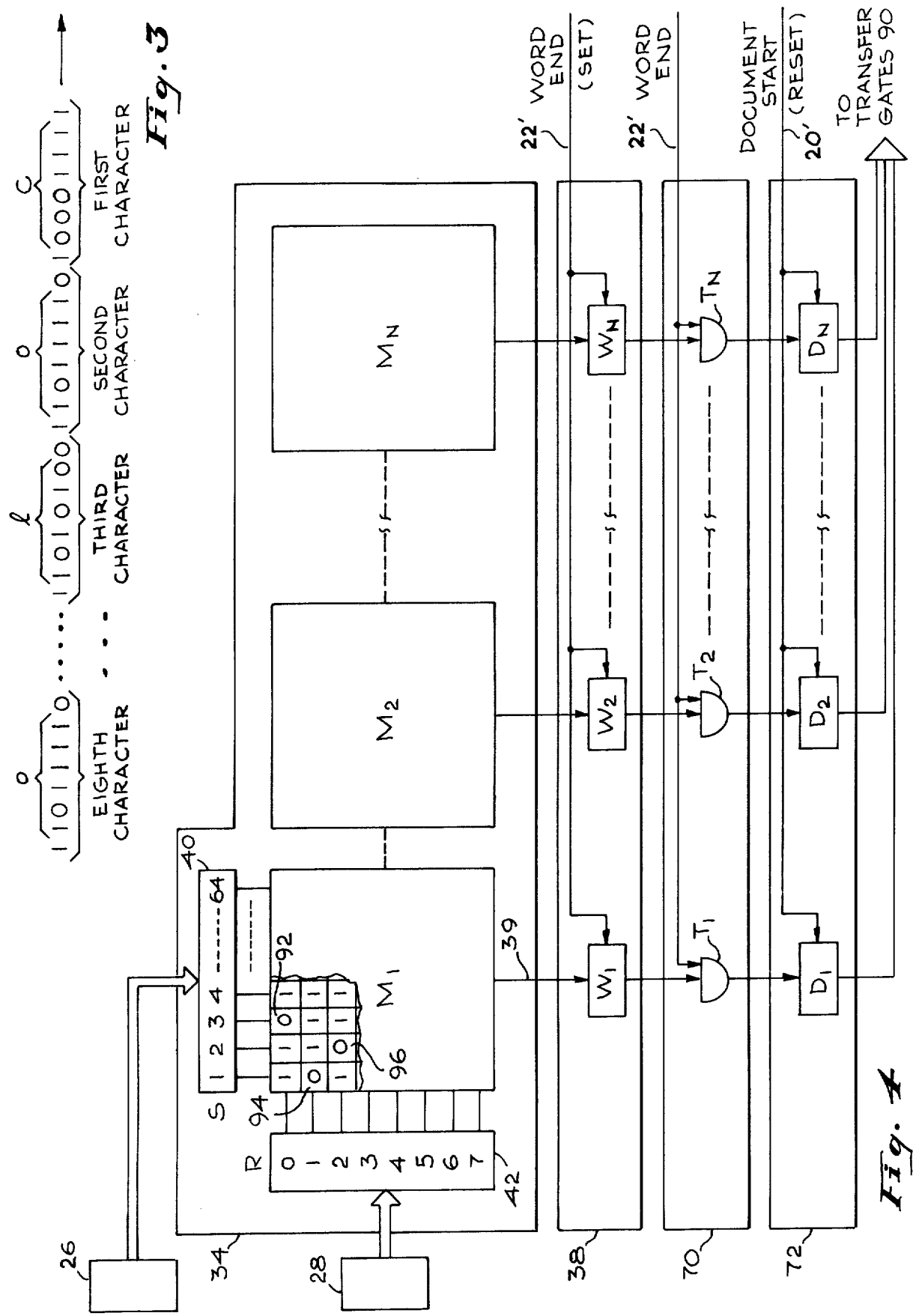

HIGH-SPEED TERM SEARCHER

FIELD OF THE INVENTION

This invention relates to a method and apparatus for searching a byte stream for predetermined character patterns.

BACKGROUND OF THE INVENTION

Apparatus and methods are known for searching a byte (character) stream for predetermined bit patterns representing particular characters. Typically, these methods involve comparing the bit pattern of each incoming byte on a bit-by-bit basis with a predetermined bit pattern. Such comparisons are conventionally made by clocking the bits through a shift register and comparing the contents of the register after each clocking step to the predetermined bit pattern. It has become increasingly difficult for systems implementing this method to maintain speed compatability with data from high-speed disks or data buses. In addition, such systems generally search for a limited number of predetermined bit patterns, and become increasingly complex as the number of possible bit patterns increases.

SUMMARY OF THE INVENTION

The present invention is directed to a method and apparatus for high-speed term searchings which is flexible in allowing various search terms to be defined and which can be readily implemented with relatively simple hardware. More particularly, the present invention is directed to a method and apparatus for use in combination with a data source supplying a stream of binary signals defining both the identities of alphanumeric characters occurring in an ordered sequence and the position of each such character within a character group for detecting the occurrence of a particularly ordered group of R characters.

An exemplary embodiment of the invention includes a search memory means comprised of multiple (N) sets of R storage locations each of which includes S bit stages, each bit stage being capable of storing a "1" or "0" state. R represents the number of characters within a character group and S represents the number of different characters that can be identified. Each of said R storage locations may store one or more "0" bits, the position of each "0" bit identifying a particular character. A first decoding means is provided responsive to the position within a character group of each character defined by the binary signals for addressing a corresponding one of the R locations. A second decoding means is provided responsive to the identity of each character defined by the binary signals for addressing a particular one of the S bit stages within the addressed location. The addressing of a stage storing a "1" generates a word mismatch signal.

The invention can be readily implemented using any of several types of memory devices, e.g., core, semiconductor, etc. arranged in various fashions. The exemplary embodiment disclosed herein will merely be assumed to contain N matrices or memory planes, each plane containing R locations with each location containing S bit storage stages. Each bit stage is capable of defining a particular character and each plane is capable of defining a particular character group, i.e., search term. It should be understood that reference herein to "R locations" and "S bit stages", is intended to be exemplary only and that R.S bit stages can be physically configured in many different manners, all within the intended scope of the present invention.

In the exemplary embodiment disclosed herein, each character occurring in the byte stream causes a corresponding location in each of the N memory planes to be simultaneously addressed. A word match register comprised of N bit storage stages is provided, each stage being coupled to a different one of the N memory planes. At the beginning of a search, all word match register stages are set to a match state. The generation of a word mismatch signal by the memory plane coupled to a word match register stage switches the stage to a mismatch state. Thus, if any word match register stages remain in a match stage after R characters have been examined, then those stages indicate that the search term stored in the corresponding memory plane occurred in the byte stream.

BRIEF DESCRIPTION OF THE DRAWINGS

FIG. 3 is a representation of incoming binary signals of the type processed by a system according to the present invention; and FIG. 4 is a block diagram showing the relationship between the search word memory, the word match register and the document match register.

DETAILED DESCRIPTION

As required, a detailed illustrative embodiment of the invention is disclosed herein. This embodiment exemplifies the invention and is currently considered to be the best embodiment for such purposes. However, it is to be recognized that other equivalent embodiments may be suggested to those skilled in the art falling within the scope of the present invention as claimed.

The purpose of the system is to provide high-speed searching of an incoming byte stream 10 wherein each byte may comprise an alphanumeric character and a group of ordered bytes may define a word or search term. Apparatus in accordance with the invention is useful for rapidly searching the byte stream to determine if the stream contains certain preselected search terms or key words. For example, if a key word were "Colorado", then the system could be utilized to detect each occurrence of the word "Colorado" in the incoming byte stream.

In connection with the exemplary embodiment disclosed herein, it shall be assumed that the byte stream contains a "space" code (Sp) at the end of each word. Thus, the word "Colorado" in the byte stream will be represented by the nine byte string C-o-l-o-r-a-d-o-Sp. On the other hand, the word "Coloradoans" will be represented by the twelve byte string C-o-l-o-r-a-d-o-a-n-s-Sp. The word "Color" may be represented by the six byte string C-o-l-o-r-Sp.

It shall also be assumed in the disclosure embodiment that only the initial eight bytes or characters in each word are used in the comparison operation to determine whether the word matches a preselected search term. Based on this assumption, if "Colorado" is selected as a search term, then the appearance of "Coloradoans" in the byte stream will be considered a match since the first eight bytes of each word are identical. However, the appearance of "Color" in the byte stream will not produce a match since it will differ from the search term in its sixth byte; i.e., "Sp".

Figure 1:
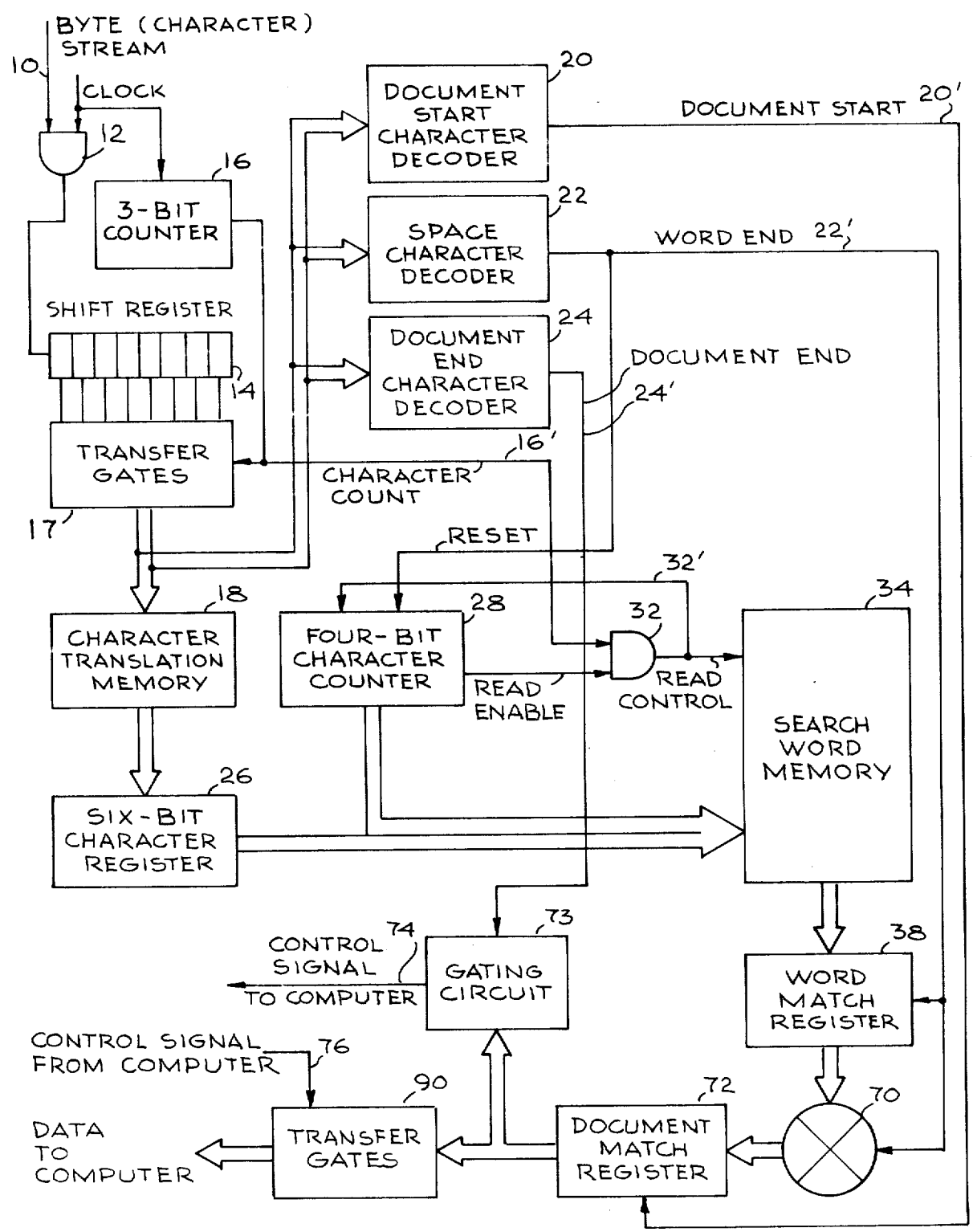
FIG. 1 is a block diagram of a high-speed word search system according to the present invention.
Figure 2A:
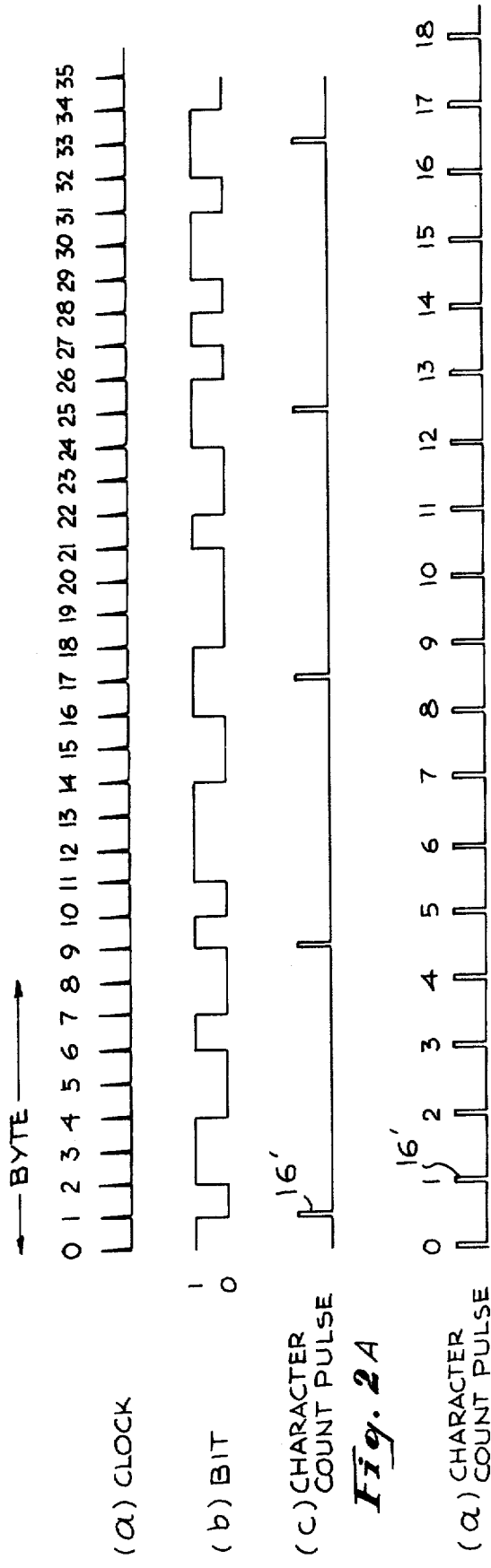
FIGS. 2A and 2B show timing signals used by the system and their relationship to each other.
Figure 2B:
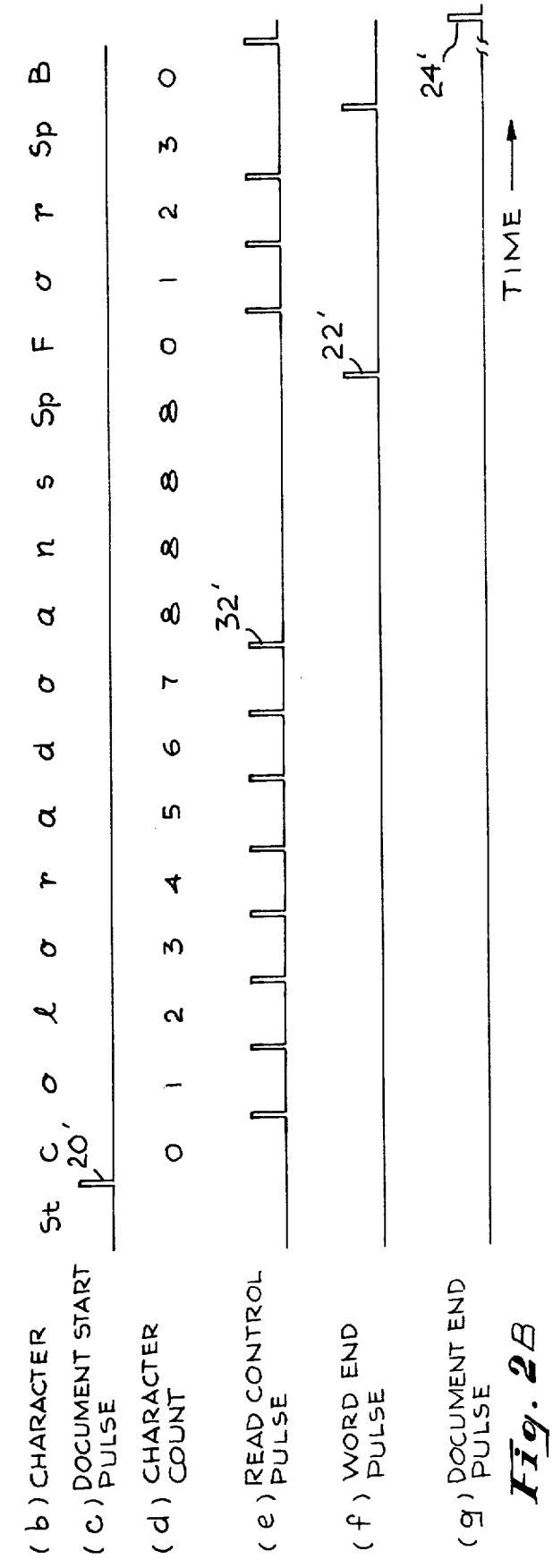

Prior to considering the exemplary implementation of the invention depicted primarily in FIGS. 1 and 4, reference will initially be made to the timing signal diagrams of FIGS. 2A and 2B and the coding format diagram of FIG. 3 to present an overview of the operation of a system in accordance with the invention. FIG. 3 depicts an illustrative byte stream comprised of a first character "C", a second character "o", a third character "l" and an eighth character "o". Each character has been represented by eight bits in which the middle six bits are coded in accordance with the US ASC II Code. Six bit encoding, of course, enables sixty four different characters to be defined. For purposes of the present invention, the first and last bits in each byte can be ignored, the first bit typically comprising a digital identifier and the last bit typically comprising a parity bit. It should be understood that the particular coding format assumed herein is for illustration only and virtually any other form of binary coding could be utilized in accordance with the invention. As will be discussed hereinafter in connection with the description of FIG. 1, the illustrated eight bit bytes are initially converted to six bit bytes by a character translation memory 18 and the six bit bytes are then supplied to a six bit character register 26. If the incoming bytes stream contained six bit bytes, then the character translation memory 18 could be deleted.

Referring now to FIG. 2A line (a) depicts a train of clock pulses occuring at the incoming byte stream bit rate and line (b) depicts the bit levels of an arbitrary byte stream. Line (c) depicts character count pulses one of which is generated for every eight incoming bits.

Referring now to FIG. 2B, line (a) depicts the same character count pulse train of FIG. 2A, line (c), but on a compressed scale. Line (b) depicts an exemplary character stream comprised of the following characters: C-o-l-o-r-a-d-o-a-n-s-Sp-F-o-r-Sp-B. Also note in line (b) that the stream is preceded by a document start code "St" which causes the generation of a document start pulse, line (c). Line (d) depicts the states of the four bit character counter 28 of FIG. 1. Line (e) illustrates that a read control pulse is developed by gate 32 of FIG. 1 once per byte, but as will be seen hereinafter, only for a limited number of stated, assumed to be 0 to 7, of the character counter 28. Line (f) illustrates that a word end pulse is developed after each appearance of the space code (Sp) in the byte stream. Line (g) illustrates that a document end pulse is generated in response to the appearance of a document end code (not shown) in the byte stream.

Referring now to FIG. 1, it shall be assumed that the byte stream 10 is supplied from some data source (not shown) and represents some document defining both the identities of alphanumeric characters occurring in an ordered sequence as well as the position of each such character within a character group. The byte stream is applied to the input of an AND gate 12 which is enabled by the clock pulses represented in line (a) of FIG. 2A. The output of gate 12 is coupled to the serial input of an eight stage shift register 14. The clock pulses are counted by a three-bit scale of eight counter 16 which develops the character count pulses 16' represented in line (c) of FIG. 2A. The counter 16 is synchronized with the incoming bits by one of various techniques known in the art to assure that it supplies a character count pulse 16' immediately after the last bit in a byte is supplied to shift register 14. Each character count pulse 16' enables a set of transfer gates 17 to transfer all eight bits from the shift register 14 in parallel to a character translation memory 18. In addition to supplying the eight bit byte in parallel to the memory 18, each byte is similarly applied to three special decoder circuits 20, 22 and 24. Decoder circuit 20 outputs the document start pulse 20' depicted in line (c) of FIG. 2B whenever the document start code appears in the byte stream. Decoder 22 outputs the word end pulse 22' depicted in line (f) of FIG. 2B whenever a space code appears in the byte stream. Decoder 24 outputs the document end pulse 24' depicted in line (g) of FIG. 2B whenever the document end code appears in the byte stream.

A four-bit character counter 28 is provided to count the character entering the character register 26. The counter 28 is provided with a read enable output line which is true only during counts 0 to 7 of the counter 28. The character counter 28 is incremented by pulses 32' provided by AND gate 32 in response to character pulses 16' occurring only during counts 0 to 7 of the character counter 28. The counter 28 is reset by the word end pulse 22' generated by the space character decoder 22. Thus, counter 28 is capable of counting upwardly from a count of zero (0000) to a count of eight (1000). In accordance with the exemplary embodiment of the invention disclosed herein, only the initial eight characters in each character group will be used for purposes of comparison with the key words stored in a search word memory 34 to be discussed hereinafter. However, more characters per word could be examined if desired. AND gate 32 provides the read control signal 32' as depicted in line (e) of FIG. 2B which comprises eight pulses corresponding to the first eight characters of each word.

Two units, a search word memory 34 and word match register 38 are provided to accomplish the key word search function. Referring to FIG. 4, it can be seen that the search word memory comprises a plurality of memory planes $M_1$, $M_2$ and through $M_N$, N being any integer. The first memory plane $M_1$ is defined by two fields; namely (1) a character identification field 40 comprised of S bit stages, each corresponding to a different character capable of being identified and (2) a character position field 42 comprised of R character locations each corresponding to a different character position within a character group. Each of counts 0 to 7 defined by the character counter 28 defines one of the R character positions. Each of sixty-four six-bit codes defined by the character register 26 identifies one of S (i.e., S=64) possible characters. Each memory plane $M_1$-$M_N$ stored information defining a key word, the number of key words to be searched for in a given document being limited only by the total number of memory planes provided. Referring now specifically to the first memory plane $M_1$, each of the S bit stages of the R locations is programmed with a "0" or a "1". A stage storing a "0" identifies a particular key word character. For example, assume that stage S1 represents "A" S2 represents "B", S3 represents "C", etc. Then a "0" stored in stage S3 identifies the character "C"; and if this is in location 0 (of R locations) it refers to the first character in the key word stored in that memory plane. A "1" is stored in all bit stages other then those in which a "0" is stored to identify a particular character.

The word match register 38 comprises a plurality of bit storage stages of flip-flops $W_1$-$W_N$, each flip-flop being associated with a corresponding memory plane $M_1$-$M_N$, respectively, in the search word memory 34.

Each of the word match register flip-flops $W_1$-$W_N$ is initially set to a "1" state by the word end pulse 22'. Subsequently, each character in the next word entering the character register 26, and its order of occurrence as identifed by the character counter 28, is provided to the search word memory 34 which then addresses the $M_1$ bit stage which corresponds to that character and its order of occurrence. Concurrently, the corresponding bit stages in memory planes $M_2$-$M_N$ are also addressed by the search word memory 34. Each memory plane has a sense line 39 which supplies an output pulse (mismatch signal) whenever the addressed bit stage therein stores a "1". The mismatch signal supplied on the memory sense line 39 functions to reset a corresponding flip-flop $W_1$, $W_2$, or $W_N$ in the word match register 38 to zero. Once being reset to zero, the word match register flip-flops $W_1$-$W_N$ cannot be set to "1" again until a word end pulse 22' is provided. If the first word match register flip-flop $W_1$ corresponding to the first memory plane $M_1$ is still in a "1" (match) state when the word end pulse 22' occurs, then the character group coming in on the byte stream 10 matched the key word stored in memory plane $M_1$. If the flip-flop $W_1$ is in a "0" (mismatch) state when the word end pulse 22' occurs, then at least one of the addressed bit stages contained a "1" and the incoming character group therefore did not match the key word stored in memory plane $M_1$. Thus, if a word being examined matches a word programmed into the memory planes $M_1$-$M_N$, then at the end of that word its corresponding word match register flip-flop $W_1$-$W_N$ will be in a "1" (match) state.

Referring again to FIGS. 1 and 4, a transfer gate 70 is provided for transferring information contained in the word match register flip-flops $W_1$-$W_N$ to a document match register 72. The document match register 72 also contains a plurality of bit storage stages of flip-flops $D_1$-$D_N$. The transfer gate 70 contains a plurality of AND gates $T_1$-$T_N$, each of which receives one input from a corresponding word match register flip-flop $W_1$-$W_N$ and a word end pulse 22' as another input. At the beginning of a document, the document match register flip-flops $D_1$-$D_N$ are all reset to a "0" (mismatch) state by the document start pulse 20'. Anytime that an output is present from one of the transfer gates $T_1$-$T_N$, the corresponding document match register flip-flop $D_1$-$D_N$ will be set to a "1" (match) state. Thus, at the end of a document search, any document match register flip-flop $D_1$-$D_N$ that contains a "1" will indicate that a search word programmed in one of the memory planes $M_1$-$M_N$ was matched in the document being searched. A gating circuit 73 is provided to determine whether or not the document match register 72 stores any "1's" when the document end pulse 24' occurs. If the register 72 does store a "1" indicating that the document just examined did contain a key word match, then the gating circuit 73 supplies a control signal (e.g., to a system computer) on line 74. The computer (not shown) can treat the control signal as an interrupt and respond when ready by supplying a control signal on line 76 to a set of transfer gates 90. The set of transfer gates 90 receives its inputs from the document match register flip-flops $D_1$-$D_N$. The gates 90 are used to provide the results of the search to a receiving device which could be the aforementioned computer, a light display, etc.

In operation, the search word memory 34 is programmed so that each bit stage contains either a "0" or "1" as previously explained. Generation of the document start pulse 20' causes the document match register flip-flops $D_1$-$D_N$ to be reset to "0", the word match register flip-flops $W_1$-$W_N$ having been set to "1" at the end of the prior word. Now assume a simple example in which "CAB" is a key word to be searched. The first memory plane $M_1$ is programmed so that a bit stage 92 corresponding to "C" in the first character location R0 contains a "0" while all other bit stages in the first character location R0 are "1's". If the first character of an incoming word is processed as previously explained, the bit stage in the R0 location corresponding to that character will be addressed. If this first character is "C", since the bit stage 92 contains a "0", it therefore will not produce an output (mismatch) pulse on sense line 39 and the corresponding word match register flip-flop $W_1$ will remain unchanged. However, if any of the other 63 bit stages in the R0 location were addressed, then the sense line 39 would provide a "1" (mismatch) output thereby resetting the word match register flip-flop $W_1$ to "0" (mismatch).

In similar manner, a second character of the incoming word will address its corresponding bit stage in the R1 location, which in the example shown, stores a "0" in bit stage 94 representing a "A". If the incoming character is anything other than an "A", then the corresponding word match register flip-flop $W_1$ will be reset to "0" because all other bit stages have been programmed with a "1". Similarly, if the third character of the incoming word is a B, then its corresponding bit stage 96 in location R2 which contains an "0" will not cause the word match register flip-flop $W_1$ to be reset to "0". If "CAB" comprises the entire first search word, then all the bit stages contained in the succeeding locations in memory plane $M_1$ can be programmed with "0's", thereby eliminating any effect they might have on the word match register flip-flops $W_1$-$W_N$. Although the above explanation is based upon only the first memory plane $M_1$, each of the additional memory planes $M_2$-$M_N$ is concurrently addressed. Assuming that the other memory planes $M_2$-$M_N$ were programmed with search words other than "CAB", then their corresponding word match register flip-flops $W_2$-$W_N$ would have been reset to "0" (mismatch).

At the end of the first word, a word end pulse 22' is provided by the decoder 22 to each of the transfer gates $T_1$-$T_N$. If any of the corresponding word match register flip-flops $W_1$-$W_N$ contain a "1", which would occur only if bit stages containing "0's" were addressed as above explained, then an output would be provided from the transfer gate $T_1$-$T_N$ to its corresponding document match register flip-flop $D_1$-$D_N$, thereby causing it to be set to a "1". At the end of a document search, a "1" state in any of the document match register flip-flops $D_1$-$D_N$ indicates that the search word programmed in its respective memory plane $M_1$-$M_N$ was contained in the document being examined.

The system provides a very flexible word search capability. Assuming that either the word "CAB" or the word "CUB" would be acceptable for the word being searched, then location R1 of the first memory plane $M_1$ could have both the A and U bit stage positions programmed as "0's", the remaining bit stages in the R1 location being programmed as "1's". Thus, when the second character of the incoming word is examined, if that character is either an "A" or "U", a bit stage having a "0" will be addressed, thereby resulting in a bit stage having a "0" being coupled to a corresponding flip-flop in the word match register 38. However, if the second character is anything other an "A" or "U", then the word match register flip-flop would be rest to a "0". At the end of each word, the word end pulse 22' triggers the transfer gate and causes the appropriate AND gate to provide an output as previously explained.

Sequencing of the system is controlled in a manner depicted in FIGS. 2A and 2B. In response to a document start code, decoder 20 generates a document start pulse 20' which resets (returns to zero) all of the flip-flop $D_1$-$D_N$ in the document match register 72. Previously, the decoder 22 generated a word end pulse 22' to set (return to "1") all of the flip-flops $W_1$-$W_N$ in the word match register 38, and to reset the character counter 28 to zero. When the first character count pulse 16' is thereafter generated at the overflow of counter 16, it enables gate 32 to cause the search word memory 34 to search locations R0 for the six bit character presented by register 26. The read control pulse 32' output by gate 32 not only operates the search word memory 34 but in addition increments the character counter 28 so that when counter 16 outputs a second character count pulse 16', the second row R1 of the N memory planes $M_1$-$M_N$ is addressed.

As the character counter 28 continues to step, the above-described process is repeated until eight characters have been applied to the search word memory 34. When the decoder 22 generates the word end pulse 22', the transfer gates $T_1$-$T_N$ transfer the contents of the word match register flip-flops $W_1$-$W_N$ to their corresponding document match register flip-flops $D_1$-$D_N$, respectively. The document end pulse 24' applied to the gating circuit 73 can be used to inform a computer (not shown) that a match has occurred. The computer then addresses the transfer gates 90 to transfer the contents of the document match register flip-flops $D_1$-$D_N$.

In view of the above description, it should now be apparent that a word search system according to the present invention provides a means for examining an incoming byte stream without having to make a bit-by-bit comparison between each incoming word and a predetermined search word, thereby reducing both search time and costs associated with conventional word search systems. It should be understood that although a particular exemplary embodiment has been disclosed herein, other equivalent embodiments and variations will readily occur to those skilled in the art all falling within the intended scope of the claims appended hereto. It should also be apparent that the system in accordance with the invention can readily be implemented with various circuit structures; as an example only, the search memory 34 can be formed of magnetic cores, semiconductors, etc. It should, of course, be understood that all reference herein to "1" and "0" states merely refer to the two different states of a binary device rather than any particular condition of the device.

What is claimed is:

1. In combination with a data source supplying a stream of binary signals defining both the identities of alphanumeric characters occurring in an ordered sequence and the position of each such character within a character group, an apparatus for detecting the occurrence of a particularly ordered group of R characters, said apparatus comprising:

search memory means comprised of a first group of R sets of S bit storage devices wherein R represents the number of entries in a character position field and S represents the number of entries in a character identification field, each of said bit storage devices defining a first or second state;

first means responsive to the position within a character group of each character defined by said binary signals for addressing the corresponding one of said R sets;

second means responsive to the identity of each character defined by said binary signals for addressing the corresponding one of said S bit storage devices within said addressed one of said R sets; and third means responsive to said first and second means addressing a bit storage device defining a first state for generating a mismatch signal.

2. The apparatus of claim 1 in which said search memory means comprises a plurality of groups of R sets of S bit storage devices wherein R represents the number of entries in a character position field and S represents the number of entries in a character identification field, each of said bit storage devices defining a first or second state;

said first means responsive to the position within a character group of each character defined by said binary signals comprises means for addressing the corresponding one of said R sets in each of said plurality of groups of R sets; and said second means responsive to the identity of each character defined by said binary signals comprises means for addressing the corresponding one of said S bit storage devices within said addressed R set in each of said plurality of groups of R sets.

3. The apparatus of claim 2 further comprising:

a word match register containing a plurality of bit storage stages each of which corresponds to one of said group of R sets;

means for placing each of said word match register storage stages in a first stage at the beginning of each of said character groups; and means for interconnecting each of said word match register storage stages to its corresponding group of R sets of S bit storage devices whereby a mismatch signal from one of said corresponding bit storage devices will cause its corresponding word match register storage stage to change from said first state to a second state.

4. The apparatus of claim 3 further comprising:

a document match register having a plurality of bit storage stages each of which corresponds to a storage stage in said word match register;

means for placing each of said document match register storage stages in a first state at the beginning of said sequence; and means for transferring at the end of each of said character groups information contained in said word match register storage stages to their corresponding document match register storage stages whereby said second state in one of said word match register storage stages will cause the corresponding document match register storage stage to change from said first state to a second state.

5. In combination with a data source supplying a stream of incoming binary signals representing a document formed of words formed of characters formed of a plurality of said binary signals, an apparatus for detecting the occurrence of a predetermined character pattern comprising;

first means for identifying the order of occurrence of a predetermined number of incoming characters in an incoming word;

a second means for identifying each incoming character; and a search memory means responsive to said first and second means for determining if each identified incoming character and its order of occurrence in an incoming word corresponds to a character and its order of occurrence in said predetermined character pattern, said search memory means comprising a first set of bit stages, each bit stage corresponding to a specific character and an order of occurrence with respect to an incoming word;

each of said first set of bit stages defining a first stage if that bit stage does not correspond to a character and its order of occurrence within said predetermined character pattern;

means for addressing each bit stage corresponding to each incoming character and its order of occurrence within an incoming word; and means for generating a mismatch signal whenever said addressed bit stage is identified with said first state.

6. In combination with a data source supplying a stream of incoming binary signals representing a document formed of words formed of characters formed of a plurality of said binary signals, an apparatus for detecting the occurrence of a predetermined character pattern comprising;

first means for identifying the order of occurrence of a predetermined number of incoming character in an incoming word;

second means for identifying each incoming character; and a search memory means responsive to said first and second means for determining if each identified incoming character and its order of occurrence in an incoming word corresponds to a character and its order of occurrence in said predetermined character pattern, said search memory means comprising N sets of bit stages, each bit stage in a set corresponding to a specific character and an order of occurrence with respect to an incoming word;

each bit stage defining a first state if that stage does not correspond to a character and its order of occurrence within said predetermined character pattern;

means for addressing each bit stage within each of N sets of bit stages corresponding to each incoming character and its order of occurrence within an incoming word; and means for generating a mismatch signal whenever said addressed bit stage is identified with said first state.

7. The system of claim 6 further comprising:

a word match register having N bit storage stages, each of which corresponds to one of said N sets of bit stages;

means for placing each of said word match register storage states in a first state at the beginning of each incoming word; and means for changing the state of each of said word match register storage stages to a second state whenever a mismatch signal is generated as a result of addressing a bit stage in its corresponding N set of bit stages.

8. A method for detecting the occurrence of a particularly ordered group or R characters from a stream of binary signals defining both the identities of alphanumeric characters occurring in an ordered sequence and the position of each such character within a character group, the steps comprising:

defining a memory plane including R storage locations, each of said locations including S bit stages each capable of storing a first state or a second state where S represents the number of different characters that can be identified, said locations storing one or more first states each identifying a particular character;

addressing one of said R locations corresponding to the position within a character group of each character defined by said binary signals;

addressing one of said S bit stages within said addressed R location corresponding to the identity of each character defined by said binary signals; and generating a mismatch signal whenever a bit stage storing a second state is addressed.

9. A method for detecting the occurrence of a particularly ordered group of R characters in an incoming stream of binary signals defining both the identities of alphanumeric characters occurring in an ordered sequence and the position of each such character within a character group, the steps comprising:

storing R sets of S bits each, where S represents the number of different characters capable of being identified;

selectively identifying a particular character in each set by establishing a unique state in one bit of the S bits thereof;

comparing each character in said incoming stream with the character identified by the particular set of S bits corresponding to the position of said character within a character group; and generating a mismatch signal whenever said comparing step indicates that the character in said incoming stream differs from the character identified by the corresponding set of S bits.

10. The method of claim 9 wherein said comparing step comprises examining the state of a particular bit within said particular set of S bits which particular bit is dependent upon the identity of the incoming stream character being compared.

11. In combination with a data source supplying a stream of binary signals representing a stream of characters arranged in character groups wherein said character stream includes S different characters, an apparatus for detecting the occurrence of a character group containing a sequence of R particular characters, said apparatus comprising:

character register means;

means for loading said character register means with successive characters in said character stream;

character counter means for counting characters in a character group successively loaded into said character register means;

a search memory means comprised of R sets of S bit storage devices, each device capable of selectively defining either a first or second state;

first addressing means responsive to each different count defined by said character counter means for addressing a different set of storage devices;

second addressing means responsive to each different character loaded into said character register means for addressing a different one of said S bit storage devices; and means responsive to said first and second addressing means addressing a bit storage device defining a first state for generating a mismatch signal.

12. The combination of claim 11 further including a word match register capable of defining either a match or mismatch state;

means for establishing a match state in said word match register prior to generating a mismatch signal attributable to addressing said search memory with respect to the first character in each character group; and means responsive to each generated mismatch signal for switching said word match register to a mismatch state.

* * * * *